United States Patent
Fairs et al.

(10) Patent No.: US 9,256,856 B1
(45) Date of Patent: Feb. 9, 2016

(54) SYSTEM AND METHOD FOR IMPLEMENTING MULTIPLE AND SIMULTANEOUS FUNCTIONS ACROSS MULTIPLE APPLICATIONS

(75) Inventors: James R. Fairs, Naperville, IL (US); Lee A. Mitchell, Du Bois, PA (US)

(73) Assignee: IMI Innovations, Inc., Naperville, IL (US)

( * ) Notice: Subject to any disclaimer, the term of this patent is extended or adjusted under 35 U.S.C. 154(b) by 99 days.

(21) Appl. No.: 13/346,669

(22) Filed: Jan. 9, 2012

Related U.S. Application Data

(60) Provisional application No. 61/430,860, filed on Jan. 7, 2011.

(51) Int. Cl.
  G09G 5/00      (2006.01)
  G06Q 10/10    (2012.01)
  G06F 3/0362  (2013.01)
  G06F 3/038    (2013.01)

(52) U.S. Cl.
  CPC .............. G06Q 10/10 (2013.01); G06F 3/038 (2013.01); G06F 3/0362 (2013.01)

(58) Field of Classification Search
  None
  See application file for complete search history.

(56) References Cited

U.S. PATENT DOCUMENTS

2010/0017727 A1* 1/2010 Offer et al. .................... 715/753

OTHER PUBLICATIONS

Mark Roseman and Saul Greenberg, TeamRooms: Network Places for Collaboration, 1996, ACM, CSCW '96 Proceedings of the 1996 ACM conference on Computer supported cooperative work, 325-333.*

* cited by examiner

Primary Examiner — Xiao Wu
Assistant Examiner — Mohammad H Akhavannik
(74) Attorney, Agent, or Firm — Fernandez & Associates, LLP

(57) ABSTRACT

Systems and methods are disclosed herein which enable simultaneous manipulation of user-interface objects by a plurality of users across a network of a plurality of nodes using multiple independent data paths, wherein on each node, an input device activates a plurality of user-interface elements, and such activations are replicated across each node. Only user-interface change data is transmitted, thereby enabling real-time, simultaneous collaboration without transmitting an image of the user interface.

9 Claims, 7 Drawing Sheets

Computer 1 State A

Computer 2 State A

Computer 1 State B

Computer 2 State B

SYSTEM AND METHOD FOR IMPLEMENTING MULTIPLE AND SIMULTANEOUS FUNCTIONS ACROSS MULTIPLE APPLICATIONS

CROSS REFERENCE TO RELATED APPLICATIONS

This application claims priority to U.S. Provisional Patent Application No. 61/430,860, entitled "System and Method for Implementing Multiple and Simultaneous Functions Across Multiple Applications" filed on Jan. 7, 2011. Said application is incorporated herein by reference in its entirety.

BACKGROUND

1. Field

This invention relates generally to real time, simultaneous multiple data stream input within computer applications, and more specifically to systems and methods for the simultaneous manipulation of independent user-interface objects within a computer and/or across a network.

2. Related Art

Various technologies exist for viewing and controlling user-interface elements for application sharing, control or collaboration. A common example of such an application being network collaboration and presentation technologies. Conventional network collaboration and presentation technologies rely on what is called "screen sharing", which allows remotely connected users using one or more computing devices to view the contents of the screen of a single host computing device in real time. Some of these collaboration, remote desktop, or "webinar" tools will allow a single local or remote user to take control of the user interface on the computer which is sharing its screen, while others allow switching the transmitted display to the user-interface (UI) of another, single, connected host computing device. However, none allow simultaneous manipulation of user-interface elements by multiple users on multiple nodes.

Such methods have several problems. First, because an image of an entire screen is being transmitted to the remote nodes from a host, data transmission rates from the host to the client devices are comparatively high. If the available network bandwidth between nodes is insufficient for such large amounts of data, lag in the display image, and dropped or distorted images, can create severe usability problems, and a degraded user experience. Further, such large amounts of data can degrade the processing ability of both the host and the client devices, reducing the ability to perform other tasks. Another problem with such technology is that only one user is in control at any given time. If another user needs to control the UI on the host device, control of the host UI must be relinquished exclusively to the client. Likewise, in traditional screen sharing applications, if a client wishes to become a host, showing what is on their screen, view of the original host and control by the original host's user would be lost.

Accordingly, there is need for a system and method that allows for the remote manipulation of user interface objects on a remote computer without the need to transmit large amounts of data, as does screen sharing, and is capable of manipulating multiple UI elements across a plurality of nodes. Further, for true, simultaneous, collaboration, users need to be able to act simultaneously and freely with respect to UI elements.

SUMMARY

Herein are disclosed systems and methods for implementing multiple and simultaneous functions across multiple applications. The system comprises a first computing device capable of accepting input (including, but not limited to, personal computers, servers, portable wireless devices, cellular phones, smart phones, PDAs, video game systems, tablets, or other specialized devices); in one embodiment, one or more input device (including, but not limited to, a mouse, joystick, track ball, track pad, touch screen, pen, stylus, motion sensor, video camera, magnetometer, accelerometer, GPS, or other sensing device); in an alternative embodiment, input may be provided by software, firmware, sensor or other automated device; input device interface; input aware software; a first user-interface object; a first software application for monitoring independent multiple user-interface objects and elements for data modification; a first network interface; a first sending and receiving software application for transferring data modification information across the network interface in one embodiment, or within the same computer in another embodiment; a data network (including but not limited to, Ethernet, LAN, WAN, WiFi, cellular, fiber optic, USB, IEEE 1394, IEEE 802, infrared, laser, Blue Tooth, etc.) for sending and receiving data modification information synchronously or asynchronously; a second computing device; a second network interface; a second sending and receiving software application for sending or receiving data modification information synchronously or asynchronously; a second user-interface object; said second sending and receiving software application replicating the changes in the data modification information for the second user interface object, also affecting the control of application. While the above embodiment of the present invention depicts software capable of both sending and receiving, in alternative embodiments software applications can be send only, receive only, or both. In yet another embodiment a server can reside between two or more sending and/or receiving computing devices. Said server may be, but is not limited to, acting to facilitate communication, routing, Quality of Service, data flow management, load balancing, or provide shared resources. Alternatively, a plurality of computing devices may communicate in a peer-to-peer network of nodes or a network cloud.

A computer-implemented method for implementing multiple and simultaneous functions across multiple applications, wherein software application on a first computing device monitors independent multiple user-interface objects and/or elements for data modification, transfers said data modification information to a receiving application on a second computing device, wherein said second computing device replicates the changes on the first computing device in the corresponding user-interface object on said second computing device. Said method comprising the steps of: monitoring multiple user interface objects and elements for data modification on a first computing device; transferring said data modification information to a sending and receiving application; receiving data modification information by a second computing device; replicating data modification information on corresponding user-interface elements on a second computing device.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings, and system diagrams.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be noted that "MultiNet" and "MultiNet enabled" are used to describe applications and UI elements which have been given the capability to monitor, detect, send and/or receive, and replicate UI change data on a remote system across multiple independent data streams.

Figure 1:
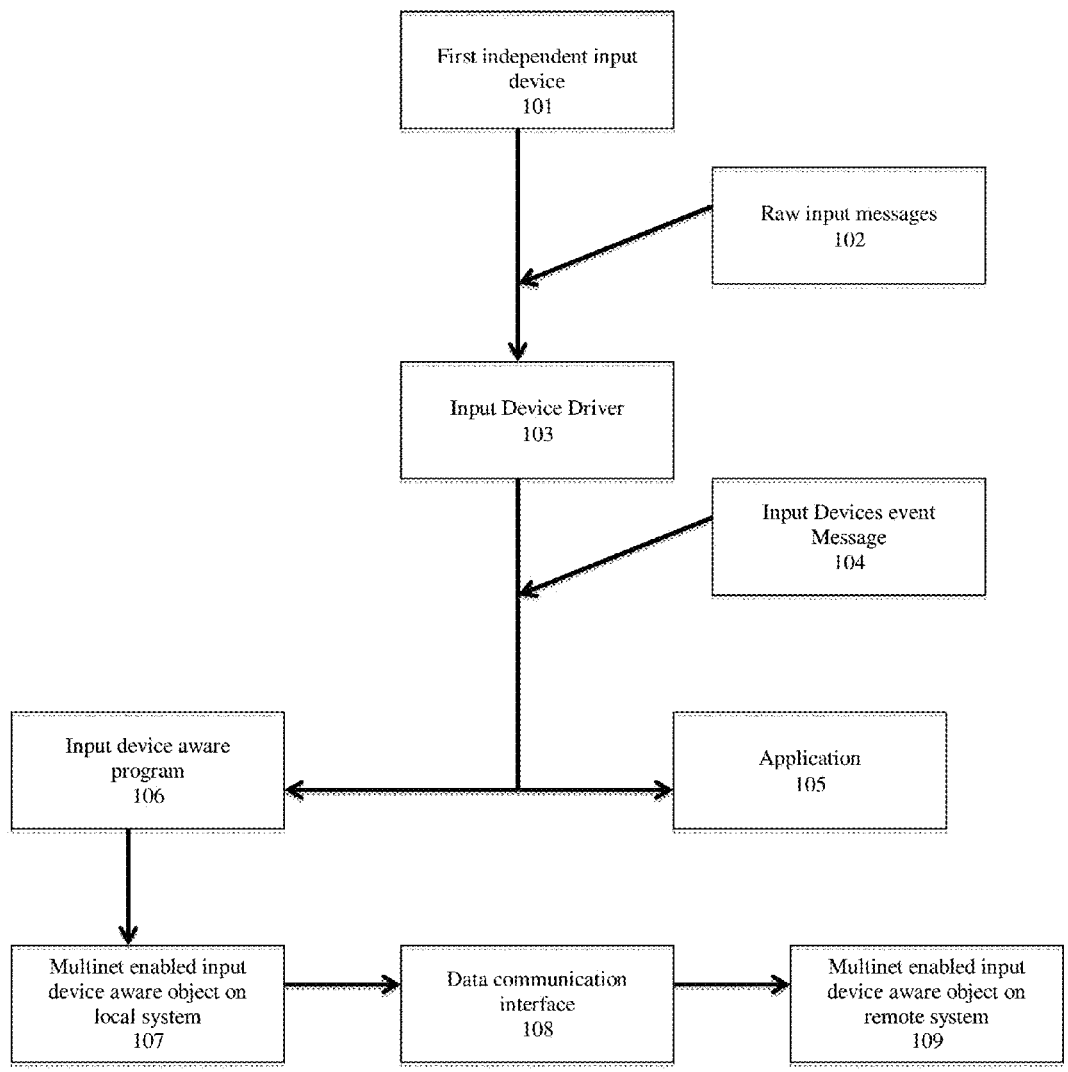
FIG. 1 is a diagram showing data flow from user input device to input aware object on a local system to a second input aware object on a remote system according to one exemplary embodiment of the present invention.

FIG. 1 is a diagram showing data flow from user input device to input aware object on a local system to a second input aware object on a remote system according to one exemplary embodiment of the present invention. As understood herein, the term "input devices" is interpreted and construed broadly to mean any input device or any input functionality, software, hardware, or firmware, which generates continuous or discrete input signal, based on either human manipulation or, in alternative embodiments, automated through software or triggered by sensor data. Examples of such input devices include, but are not limited to, standard mice, modified mice, touch screens, drawing pads, game controllers, touch pads, keyboards, voice driven input systems, joystick, track ball, track pad, touch screen, pen, stylus, motion sensor, video camera, magnetometer, accelerometer, or other sensing device, as well as various firmware, etc. Input devices 101 may be connected to the user interface via wire, IR, wireless, or remotely, such as over the internet, and other means. FIG. 1 shows the flow of data from first input device 101 to MultiNet enabled input device aware object on a local 107 to MultiNet enabled input device aware object on a remote system. It should be noted that while the present example recites "input device aware", such references should be interpreted to mean any input, such as from alternative embodiments of the present invention which use software or other non-device methods, sensors or other automated methods to provide input.

Raw input message 102 is then processed by input devices driver 103. Raw input message generally includes positions of the first independent input devices 101, movements of the multiple independent input devices 101, and states of other multiple independent input devices elements, such as buttons. Input devices driver 103 takes raw input message and converts it to X/Y coordinate data of the input device movements on a plane and states of other device elements. Operating system software also takes raw input message directly from multiple independent input devices 101. Operating system software interacts with input devices driver 103 by sending request to input devices driver 103 for input devices event message 104 and receiving input devices event message from input devices driver 103. Such software may reside on data storage devices such as RAM, ROM, hard disk, flash memory, or network or cloud based data storage. Preferably, input devices driver 103 comprises standard system input devices driver, and/or specialized/modified input devices driver. Examples of input devices driver 103 include, but are not limited to, system mouse driver, modified mouse driver, touch screen driver, drawing pad driver, game controller driver, touch pad driver, voice driven input system driver, as well as various firmware drivers, etc.

In one embodiment, independent cursors and control points are generated by operating system software together with input devices driver 103, and are fully under control of movements and states of independent input devices 101. As understood herein, the term "cursors and control points" is interpreted and construed broadly to mean any indicator or marker comprising a movable point on visual display. Examples of cursors and control points include, but are not limited to, cursors, control points, or functionalities embedded within an application, wherein such cursors and control points could be either visible, or could be embedded but not rendered in visible forms. Movements of, and changes on, other states of the cursors and control points under the control of input devices allow user to point to commands or screen positions. However, in alternative embodiments, such as those where input originates with software or signals produced by sensing devices, it is envisioned that the present invention can operate without cursors or control points.

Input devices driver 103 sends input devices event message to application 105 or input device aware program 106. As understood herein, the term "application" is interpreted and construed broadly to mean any application software provided by operating system or installed on operating system, or any application connected to operating system, in an embedded system with or without an operating system, or any application on the internet or intranet. Input device aware program 106 is designed for users to exploit the functions of the MultiNet enabled device aware object 107. Input device aware program 106 interprets the input devices event message from input devices driver 103 and controls input device aware objects 107. Input device aware objects 107 are designed to monitor, send receive and replicate change data of input device aware UI objects.

As understood herein, the terms "input device aware objects" and "input aware objects" are interpreted and construed broadly to mean any input control objects such as input devices numeric input boxes, input devices scroll bars, input devices menus, other input aware objects, and numerous spoken voice input device objects.

To programmatically generate input devices event message 104, a pointing devices data interpreter sends a request to execute a mouse operation to input devices driver 103. Input devices driver 103 reads in the data presented by pointing devices data interpreter and converts it to X/Y coordinate data of the multiple input devices movements on a plane and states of other device elements. Upon the request by pointing devices data interpreter to execute a mouse operation, input device driver 103 sends input devices event message back to operating system interface software.

Figure 2:
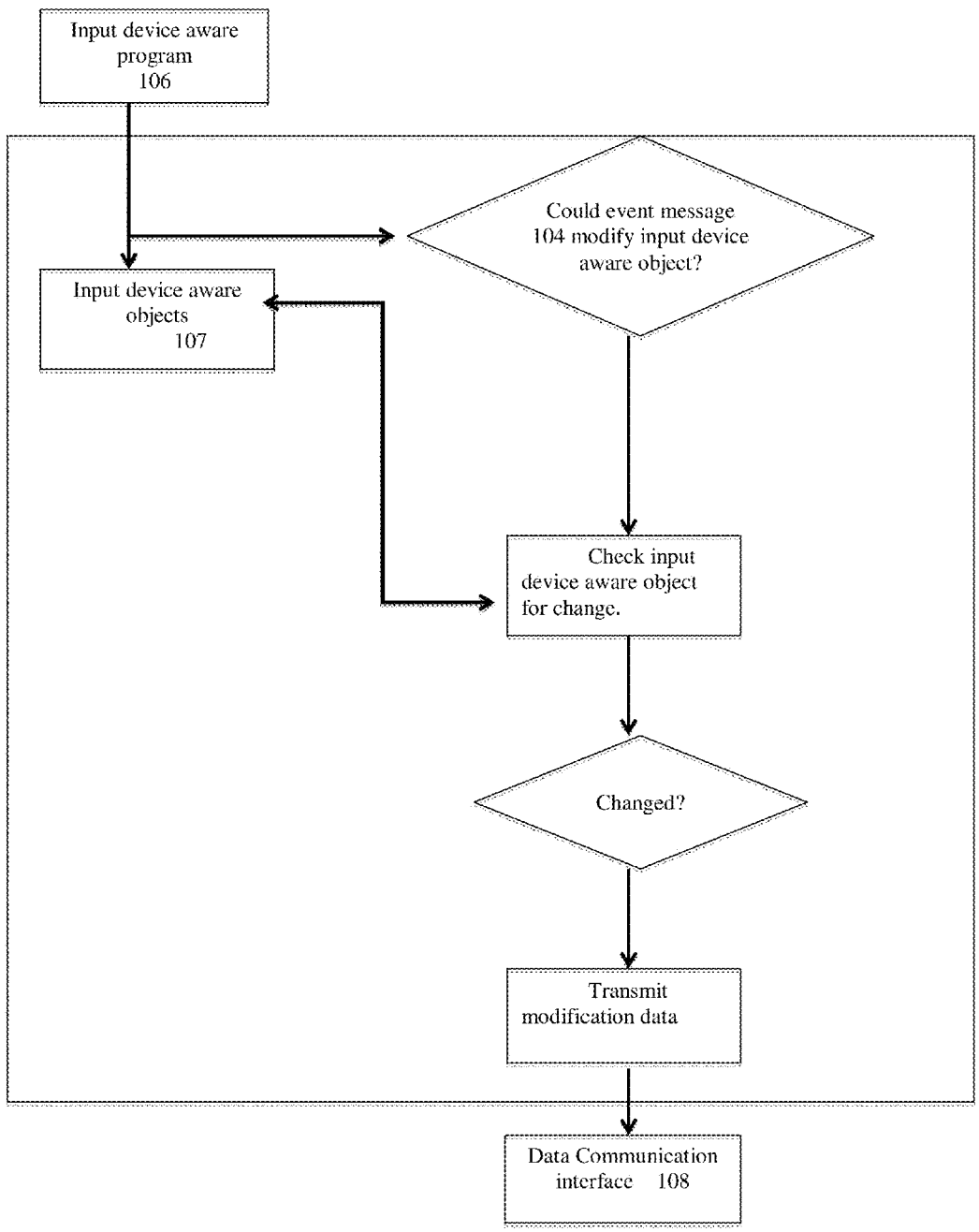
FIG. 2 is a diagram showing a MultiNet enabled input aware user-interface object on a local system.

As illustrated in the embodiment in FIG. 2, input devices event message generated by input devices driver 103 is also received by either input device aware program 106 or application 105. Upon input devices event message, input device aware program 106 controls input device aware objects 107.

FIG. 2 is a diagram showing a MultiNet enabled input device aware user-interface object on a local system. Data enters into an input device aware object 107 (including, but not limited to button, slider, checkbox, etc.). User interface objects are monitored for change. For example, UI elements such as sliders, buttons and check boxes all depict values when in one state or another. When activated by input from a user, automated system or sensor, the value is modified. When data modification is detected, a sending and receiving software application transmits data modification information to a data communication interface 108. Data communication interface could be any type of data transmitting technology for sending and receiving data modification information synchronously or asynchronously, including but not limited to, Ethernet, LAN, WAN, WiFi, cellular, fiber optic, USB, IEEE 1394, IEEE 802, infrared, laser, Blue Tooth, etc.

Figure 3:
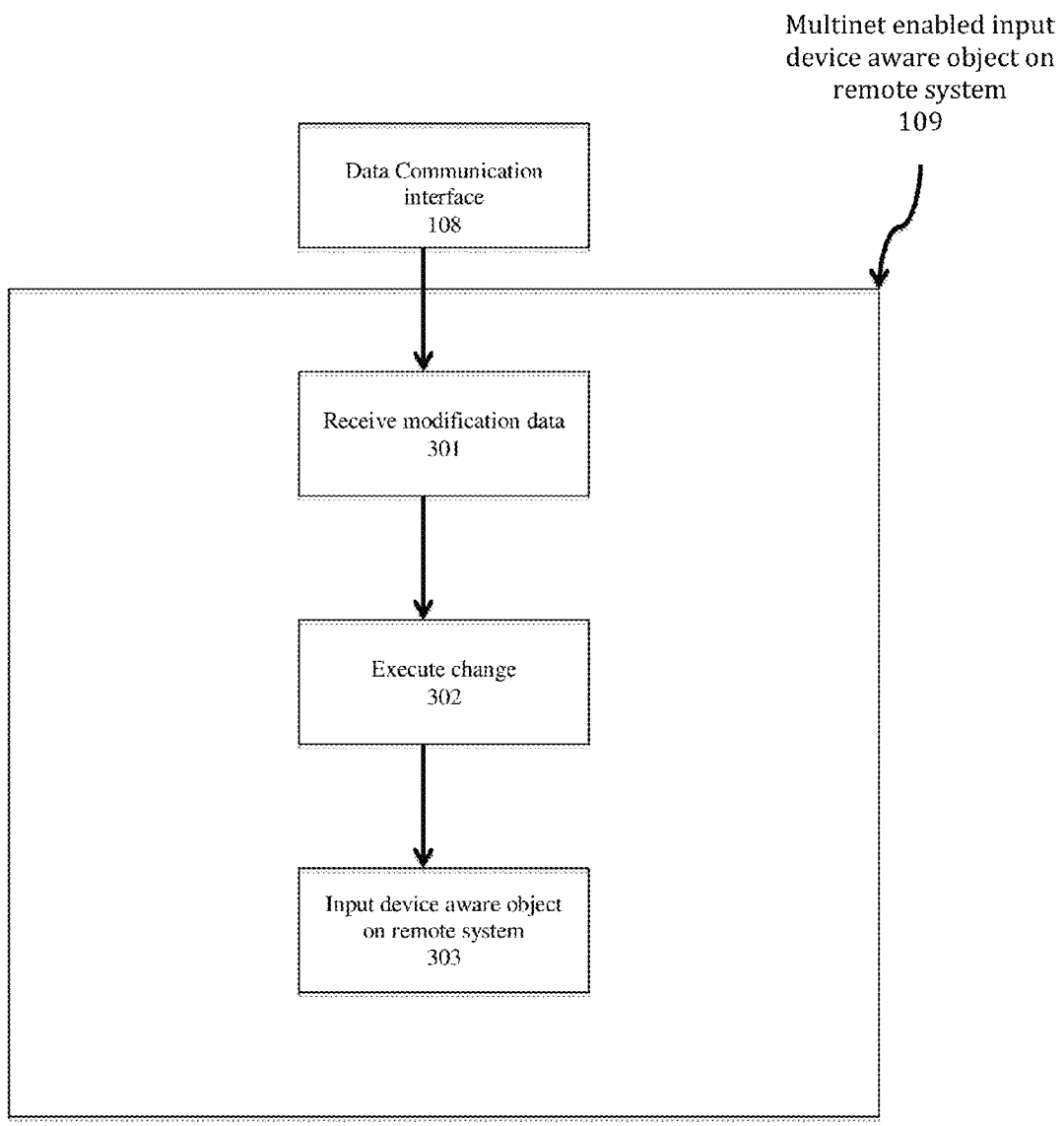
FIG. 3 is a diagram showing a MultiNet aware user-interface object on a remote system according to one exemplary embodiment of the present invention.

FIG. 3 is a diagram showing a MultiNet aware user-interface object on a remote system according to one exemplary embodiment of the present invention. Data modification information being received 301 by input device aware object on remote system 109 from data communication interface 108. The execute change module 302 replicates the data modification information from the local system in the input device aware object on remote system 303.

FIGS. 1-3 depict data modification information traveling in one direction, to the remote computing device. However, in an embodiment of the current invention, the data modification information can be simultaneously moving in the opposite direction, using multiple independent data paths, thereby enabling simultaneous input and simultaneous UI object manipulation. For example, in one embodiment, various forms of digital media can be edited collaboratively using MultiNet enabled applications. In the case of digital video editing, a local user can be using one set of UI controls to apply an audio track to the video, while a remote user adds title and caption information simultaneously and in real time. Co-gesturing can be used to point out or highlight tools to another user. The types of media that can be edited collaboratively includes, but is not limited to, video, text, audio, technical drawings, software development, 3D modeling and manipulation, office productivity tools, digital photographs, and multi-media presentations. In another embodiment, audio mixing can be performed in real time by musicians in remote locations, enabling the means to perform together, live, without having to be in the same location.

Figure 4:
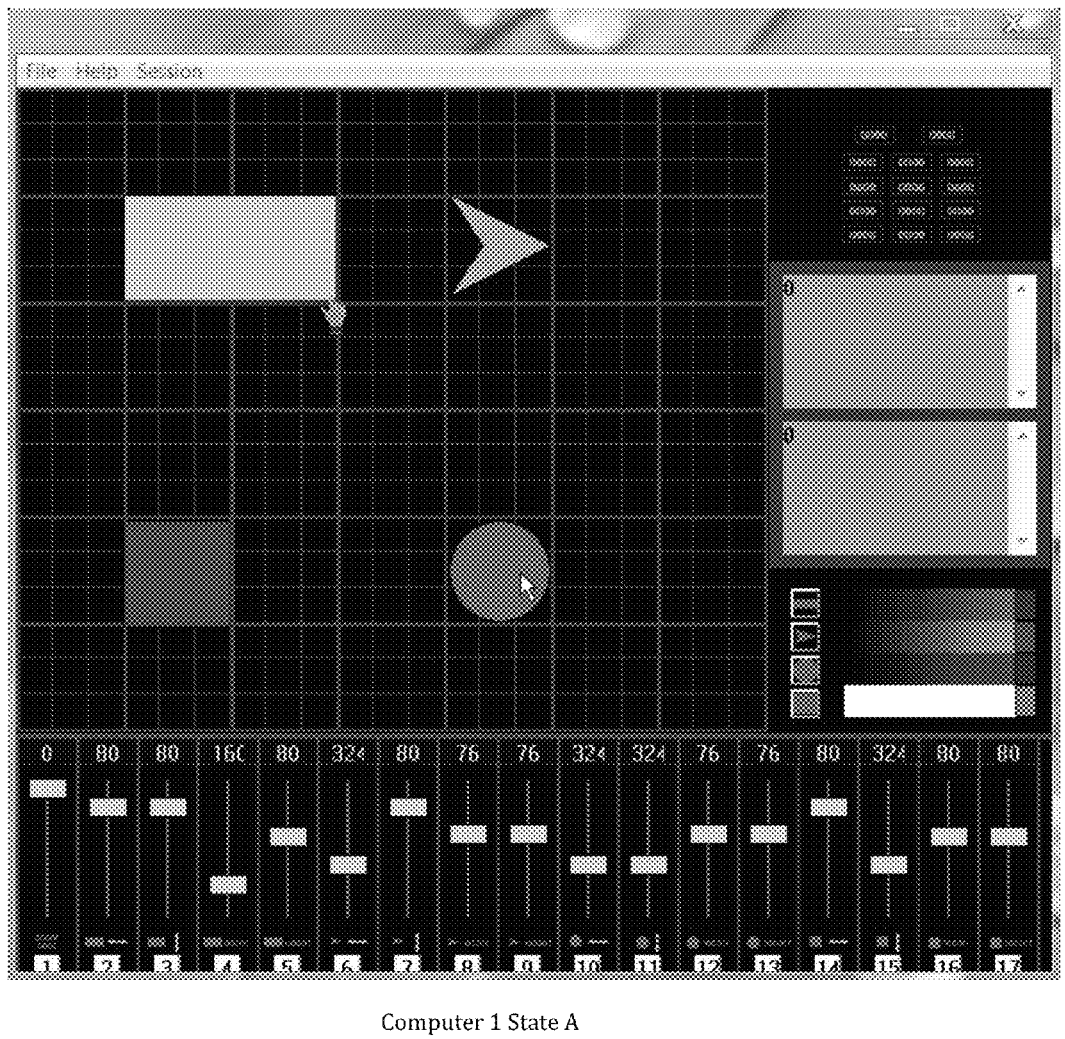
FIG. 4 is an illustration of sample UI elements in a first state on a local system according to one exemplary embodiment of the present invention.
Figure 5:
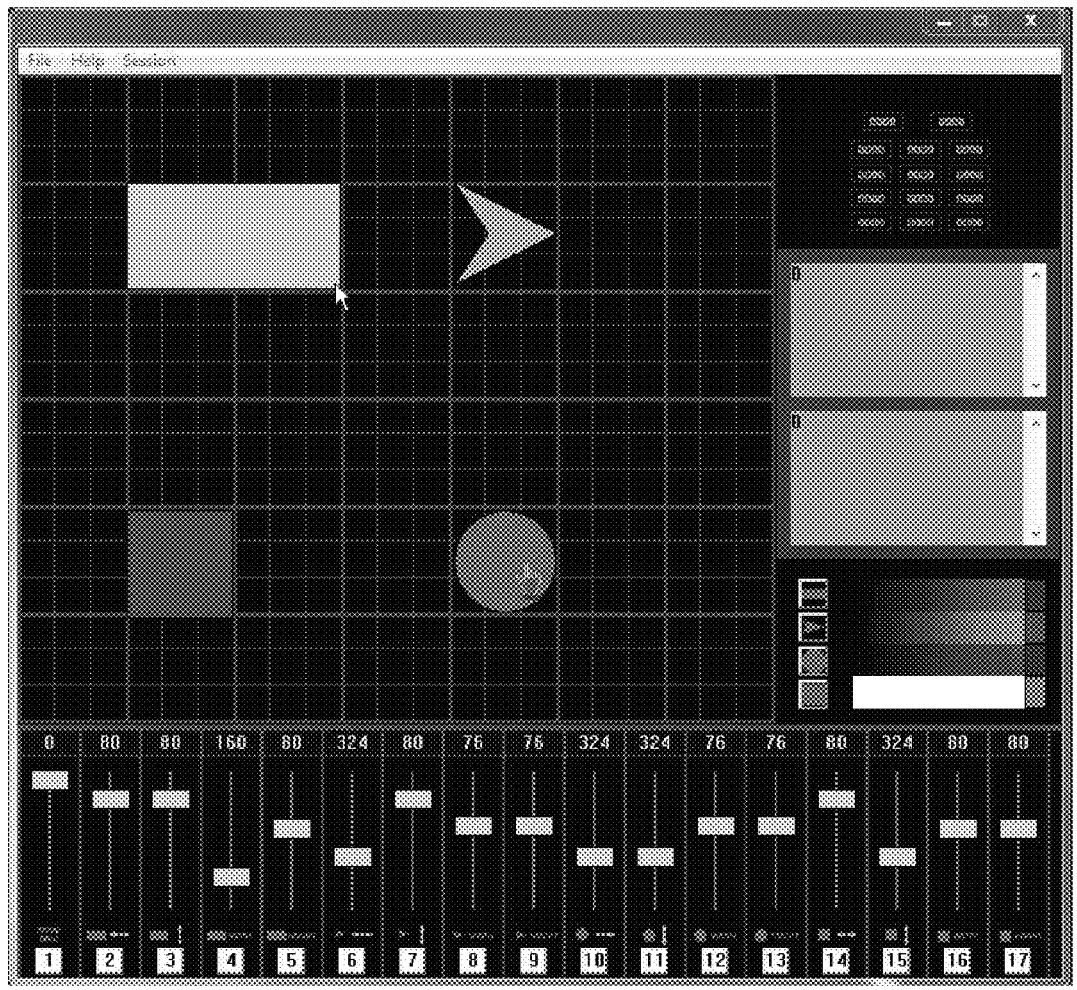
FIG. 5 is an illustration of sample UI elements in a first state on a remote system according to one exemplary embodiment of the present invention.

FIGS. 4-7 depict an example of simultaneous manipulation of user interface elements on two separate computers by two different users. These figures depict a sample software application running on each of Computer 1 and Computer 2. FIG. 4 is a screen shot of Computer 1 in state A. Note that there are two cursor elements, each pointing at a user interface element which is a MultiNet enabled input device aware object. In FIG. 4, the local cursor, which is controlled by a local input device, is depicted as an arrow, and is shown selecting a circle. The second cursor, depicted as a hand, is controlled by a remote user using Computer 2. This second cursor is shown selecting a rectangle. FIG. 5 depicts the view from Computer 2, and shows the cursor types reversed.

Figure 6:
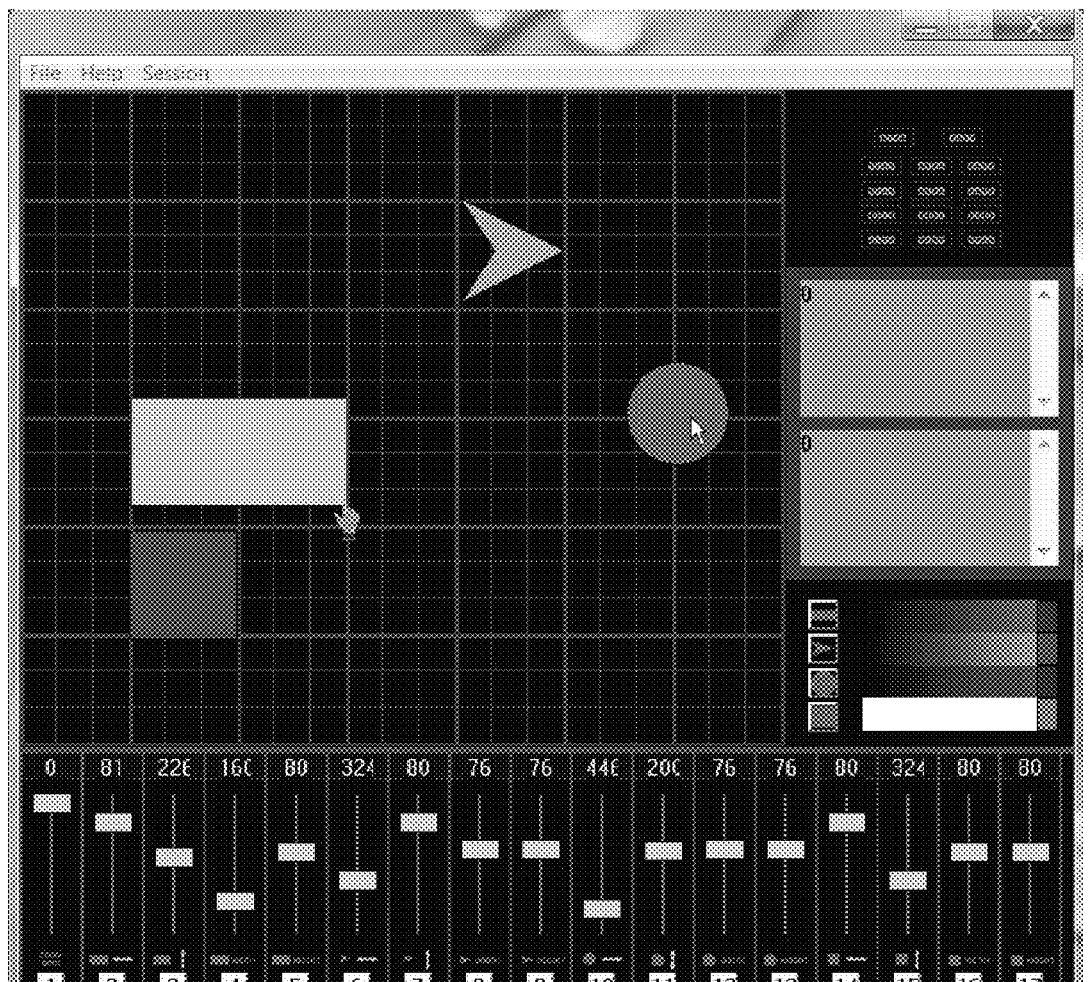
FIG. 6 is an illustration of sample UI elements in a second state on a local system according to one exemplary embodiment of the present invention.
Figure 7:
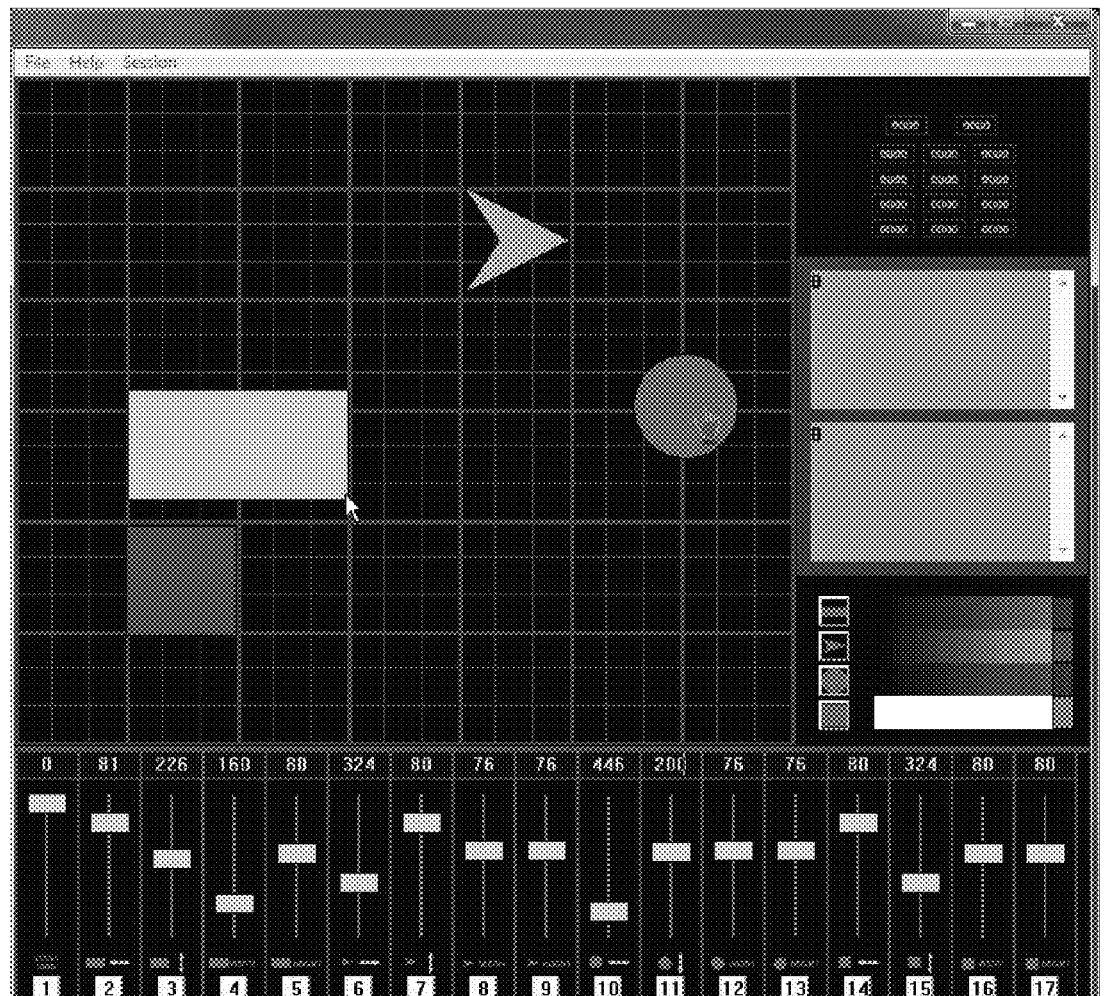
FIG. 7 is an illustration of sample UI elements in a second state on a remote system according to one exemplary embodiment of the present invention.

FIG. 6 depicts Computer 1 in state B. Here, the user of Computer 1 has selected and moved the circle element up and to the right of the screen, while simultaneously, the user of Computer 2 has selected and moved the rectangle down and to the left. Both computers are sending and receiving data modification information simultaneously, without having to send any screen image data or high-volume data transmission.

The sample application depicts two users collaborating within an application running on each system. The present invention however is not limited to two users, and it is anticipated that applications can use any number of independent multiple input data streams to parse any number on input devices independently, to create new, real time user interface environments.

Also, Computers 1 and 2 are depicted as running the same application. This is not a limitation of the present invention. It is envisioned that application types may differ. For example, a local application showing UI elements for control of particular machine functions on a remote server, machine interface, or other computing device may be either a simplified version of the remote UI elements or more complex. The present invention is cross-platform, thereby enabling, in one embodiment, a remote wireless devices to send UI data modification information to a server, computer controlled vehicle or medical device. Further, because only the underlying UI change data or control information is being transmitted, the amount of bandwidth needed to carry the information while preserving its simultaneous, real-time advantages is very small. Therefore, even limited bandwidth devices such as smartphones can take full advantage of the present invention.

Further, it is an aspect if the present invention that in an embodiment such as depicted in FIGS. 4-7, that when one node joins a group already in progress, complete state data of some or all UI elements may be transmitted to the application software on the new node. In such cases and in others, sending complete state data rather than just changes may be desirable.

In still another embodiment, a military application may have multiple soldiers on the ground, each with a computing device node, collaborating to simultaneously control a multi-camera aerial drone. Cameras can be quickly moved to focus on changing circumstances. Again co-gesturing can be used by several users, each using their own remote node, to point out objects or people on the ground, and other UI tools such as highlighting, zooming, light amplification, and infrared imaging can be activated by anyone who may need it instantly and simultaneously.

The foregoing described embodiments of the invention are provided as illustrations and descriptions. They are not intended to limit the invention to the precise form described. In particular, it is contemplated that functional implementations of the invention described herein may be implemented equivalently in hardware, software, firmware, and/or other available functional components or building blocks, and that networks may be wired, wireless, or a combination of wired and wireless. Other variations and embodiments are possible in light of the above teachings. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claim.

We claim:

1. A computer-implemented method for implementing independent, multiple and simultaneous functions across multiple applications, said method comprising the steps of:
   monitoring independent multiple user interface objects and elements for data modification on a first computing device;
   generating input data modification information from multiple input data streams via corresponding input devices, wherein each of the multiple input data streams are sent or received over a network by each of a corresponding listening second plurality of computing devices;
      wherein the said generating comprises simultaneously processing a single or plurality of networked independent input data messages, such that the said independent input data messages comprise information on positions and movements of each of the corresponding input generating devices which generate the corresponding input data messages, and states of the multiple independent input device elements in real-time;
   converting the processed networked independent input data messages to X/Y coordinate data of control points comprised in the input device movements on a plane and states of other device elements, as represented within the listening devices;
   distinguishing screen image or high-volume data from the generated data modification information, and sending and receiving data modification information simultaneously, without sending the screen image data and the high-volume data to one or more sending and receiving applications;
   receiving input data modification information by a plurality of computing devices;
   replicating said input data modification information on corresponding user-interface elements on said plurality of computing devices.

2. The method of claim 1 further comprising:
   generating a plurality of simultaneous and independent input data streams between said first and said plurality of computing devices, thereby enabling said user interface objects and elements to be simultaneously and independently modified by a plurality of users.

3. A system for implementing multiple and simultaneous functions across multiple applications, said system comprising:
   a first computing device capable of accepting multiple input data streams parsed as completely and simultaneously independent, comprising a first user-interface, one or more input devices for generating input data, input device interface, input aware software, first user-interface objects, and first software applications for monitoring simultaneous and independent multiple user-interface objects and elements for data modification, a first network interface, and first sending and receiving listening software applications for transferring data modification information for said first user-interface objects across the network interface;
   a data network for sending and receiving data modification information;
   a plurality of computing devices capable of accepting multiple input data streams parsed to become completely and simultaneously independent, comprising a plurality of user-interfaces, a plurality of network interfaces, a plurality of sending and receiving listening software applications for sending or receiving data modification information, and a plurality of user-interface objects;
   said plurality of sending and receiving listening software applications receiving multiple input data streams parsed to become completely and simultaneously independent, enabling input of the first input device to operate said plurality of computing devices thereby replicating the changes in the data modification information for the first user interface object in the plurality of user interface objects;
   said plurality of sending and receiving listening software applications monitoring independent multiple user interface objects and elements from co-networked computing devices for data modification on first and all other co-networked computing devices;
   generating data modification information from multiple input data streams via corresponding input generating devices;
      wherein the said generating comprises simultaneously processing a single or plurality of networked independent input data messages, such that the said networked independent input data messages comprise information on positions and movements of each of the corresponding input generating devices which generate the corresponding input data messages, and states of the multiple independent input device elements in real-time;
   converting the processed networked independent input data messages to X/Y coordinate data of control points comprised in the input device movements on a plane and states of other device elements, as represented within the listening software applications;
   distinguishing screen image or high-volume data from the generated data modification information, and sending and receiving data modification information simultaneously, without sending the screen image data and the high-volume data to said sending and receiving listening applications.

4. The system of claim 3 wherein said input data may be provided by software, firmware, sensor or other automated device.

5. The system of claim 3 wherein the first computing device accepts input from two or more input devices.

6. A computer automated system for implementing independent, multiple and simultaneous functions across multiple applications, wherein the system comprises a processing unit coupled to a memory element, and instructions encoded thereon, which instructions cause the system to:
   monitor independent multiple user interface objects and elements for data modification on a first computing device;
   generate input data modification information from multiple input data streams via corresponding input generating devices, wherein each of the multiple input data streams are sent or received over a network by each of a corresponding listening second plurality of computing devices;
   wherein the generated data modification information is comprised in a single or plurality of simultaneously processed networked independent input data messages, such that the said networked independent input data messages comprise information on positions and movements of each of the corresponding input generating devices, and states of the multiple independent input device elements in real-time;

convert the processed networked independent input data messages to X/Y coordinate data of control points comprised in the input device movements on a plane and states of other device elements, as represented within the listening devices;

distinguish screen image or high-volume data from data modification information, and send and receive data modification information simultaneously without sending the screen image data and the high-volume data to one or more sending and receiving applications;

receive input data modification information by the one or more sending and receiving listening applications;

replicate said input data modification on corresponding sending and receiving listening applications.

7. The computer automated system of claim 6 wherein the system is further caused to:

generate a plurality of simultaneous and independent input data streams between said first and a plurality of computing devices, thereby enabling said user interface objects and elements to be simultaneously and independently modified by a plurality of users.

8. The system of claim 6 wherein said input data may be provided by software, firmware, sensor or other automated device.

9. The system of claim 6 wherein the first computing device accepts input from two or more input devices.

\* \* \* \* \*